(12) United States Patent
Ku

(10) Patent No.: US 11,185,725 B2
(45) Date of Patent: Nov. 30, 2021

(54) FIRE EXTINGUISHING APPARATUS FOR VEHICLE

(71) Applicant: Kang Yung Ku, Goyang-si (KR)

(72) Inventor: Kang Yung Ku, Goyang-si (KR)

( * ) Notice: Subject to any disclaimer, the term of this patent is extended or adjusted under 35 U.S.C. 154(b) by 143 days.

(21) Appl. No.: 16/600,633

(22) Filed: Oct. 14, 2019

(65) Prior Publication Data
US 2020/0129795 A1    Apr. 30, 2020

(30) Foreign Application Priority Data
Oct. 29, 2018 (KR) .................. 20-2018-0004889

(51) Int. Cl.
*A62C 3/07* (2006.01)
*A62C 35/62* (2006.01)
*B62D 25/08* (2006.01)

(52) U.S. Cl.
CPC ............ *A62C 3/07* (2013.01); *A62C 35/62* (2013.01); *B62D 25/081* (2013.01); *B62D 25/082* (2013.01)

(58) Field of Classification Search
CPC .. A62C 3/00; A62C 3/07; A62C 31/28; A62C 35/62; B62D 25/081; B62D 25/082
See application file for complete search history.

(56) References Cited

U.S. PATENT DOCUMENTS

| 4,047,572 A * | 9/1977 | Stary ................. A62C 3/00 169/62 |
| 5,036,924 A * | 8/1991 | Carino .............. A62C 31/28 169/70 |
| 5,511,622 A * | 4/1996 | Thompson ........... A62C 99/00 169/62 |
| 6,561,281 B1 * | 5/2003 | Arnold ................ A62C 13/00 169/43 |
| 2004/0182584 A1 * | 9/2004 | Thompson ............. A62C 3/04 169/46 |

FOREIGN PATENT DOCUMENTS

KR    20-2018-0003272    11/2018

* cited by examiner

*Primary Examiner* — Darren W Gorman
(74) *Attorney, Agent, or Firm* — Lex IP Meister, PLLC

(57) ABSTRACT

A fire extinguishing apparatus for a vehicle is provided, which is capable of quickly and easily extinguishing, at an initial time, a fire that occurs in an engine compartment of a vehicle by injecting a fire extinguishing fluid into the engine compartment from the outside of the engine compartment when the fire occurs in the engine compartment of the vehicle. The fire extinguishing apparatus for a vehicle according to an exemplary embodiment of the present invention includes: a cowl assembly provided at a boundary between the outside and an engine compartment that defines an internal space of a vehicle, and configured to divide the outside from the engine compartment; and a fire extinguishing pipe coupled to the cowl assembly to allow the engine compartment to communicate with the outside, in which an inlet portion of the fire extinguishing pipe, of which at least one end is exposed to the outside, is connected to a fire extinguisher having therein a fire extinguishing material, and an outlet portion of the fire extinguishing pipe, which is partially exposed into the engine compartment, guides the fire extinguishing material discharged from the fire extinguisher so that the fire extinguishing material is injected into the engine compartment.

5 Claims, 5 Drawing Sheets

FIRE EXTINGUISHING APPARATUS FOR VEHICLE

CROSS-REFERENCE TO RELATED APPLICATION

This application claims priority to and the benefit of Korean Utility Application No. 20-2018-004889 filed in the Korean Intellectual Property Office on Oct. 29, 2018, the entire contents of which are incorporated herein by reference.

BACKGROUND OF THE INVENTION

(a) Field of the Invention

The present invention relates to a fire extinguishing apparatus for a vehicle.

(b) Description of the Related Art

A fire sometimes occurs in an engine compartment due to abnormalities of wires or components of an electrical system, overheating of an engine, and the like when a vehicle travels or stops. However, a vehicle generally has no dedicated fire extinguishing equipment used to extinguish a fire. Therefore, a driver needs to separately install the fire extinguishing equipment such as a fire extinguisher in the vehicle, and extinguish a fire if the fire occurs in the vehicle, as necessary.

Meanwhile, when a fire occurs in the engine compartment, it may be difficult for a driver or occupant to open a hood of the vehicle and then extinguish the fire with the fire extinguisher even if the fire extinguisher is provided in the vehicle. The reason is that when smoke is caused by the fire that occurs in the engine compartment in the vehicle, it is impossible to open the hood because the engine compartment is heated or it is difficult to ensure a visual field because of the smoke. Further, even if the hood is opened, air outside the engine compartment is rapidly introduced into the engine compartment, which may cause the initial fire to spread severely. Therefore, there is a need for developing a fire extinguishing apparatus capable of quickly and easily extinguishing a fire even in a state in which a hood is not opened when a fire occurs in an engine compartment of a vehicle.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a fire extinguishing apparatus for a vehicle, which is capable of quickly and easily extinguishing, at an initial time, a fire that occurs in an engine compartment of a vehicle by injecting a fire extinguishing material into the engine compartment from the outside of the engine compartment when the fire occurs in the engine compartment of the vehicle.

An exemplary embodiment of the present invention provides a fire extinguishing apparatus for a vehicle, including: a cowl assembly provided at a boundary between the outside and an engine compartment that defines an internal space of a vehicle, and configured to divide the outside from the engine compartment; and a fire extinguishing pipe coupled to the cowl assembly to allow the engine compartment to communicate with the outside, in which an inlet portion of the fire extinguishing pipe, of which at least one end is exposed to the outside, is connected to a fire extinguisher having therein a fire extinguishing material, and an outlet portion of the fire extinguishing pipe, which is partially exposed into the engine compartment, guides the fire extinguishing material discharged from the fire extinguisher so that the fire extinguishing material is injected into the engine compartment.

The fire extinguishing pipe may be elongated with a hollow shape, and may have an opening/closing structure at either one of two opposite ends in a longitudinal direction. The fire extinguishing apparatus may include: a first cap coupled to the inlet portion and configured to restrict opening/closing of the fire extinguishing pipe with respect to the outside; and a second cap coupled to the outlet portion and configured to restrict opening/closing of the fire extinguishing pipe with respect to the inside, in which the first cap and the second cap are made of different materials. The first cap may have a handle portion provided on an outer surface thereof, and may include a heat resistive plastic cap having a screw thread provided on an inner surface thereof. The second cap may include a metal cap having a catching protrusion coupled to an outer circumferential surface of the outlet portion and configured to be opened or closed in a one touch manner by external force. The second cap may have a heat blocking coating layer formed on an outer surface thereof exposed toward the inside of the engine compartment.

The fire extinguishing apparatus may include: a first quick coupling connected to a fire extinguishing nozzle of the fire extinguisher; and a second quick coupling coupled to the inlet portion and connected to the first quick coupling.

The fire extinguishing apparatus may further include an injection unit having an inflow portion disposed in the engine compartment and connected to the outlet portion of the fire extinguishing pipe, and a discharge portion connected to the inflow portion through a fire extinguishing line and provided at a predetermined portion to inject the fire extinguishing material, which is supplied from the fire extinguisher, into the engine compartment. Here, the multiple injection units may be provided at predetermined intervals by multiple tube fittings connected to the fire extinguishing line.

The fire extinguishing material, which is discharged from the fire extinguisher and then injected into the engine compartment, is guided by the fire extinguishing pipe coupled to the cowl assembly that defines the boundary between the outside and the engine compartment in which the engine of the vehicle is provided, and as a result, the fire can be quickly and easily extinguished even in the state in which the hood is not opened when the fire occurs in the engine compartment of the vehicle.

DETAILED DESCRIPTION OF THE EMBODIMENTS

The technical terms used herein are merely for the purpose of describing a specific exemplary embodiment, and are not intended to limit the present invention. Singular expressions used herein include plural expressions unless they have definitely opposite meanings. The terms "comprises" and/or "comprising" used in the specification specify particular features, regions, integers, steps, operations, elements, and/or components, but do not exclude the presence or addition of other particular features, regions integers, steps, operations, elements, components, and/or groups thereof.

Unless otherwise defined, all terms used herein including technical or scientific terms have the same meanings as those which are generally understood by those skilled in the art. It shall be additionally construed that terms which are defined in generally used dictionaries have meanings matching the related art document and currently disclosed contents, and the terms shall not be construed as idealized or excessively formal meanings unless clearly defined in the present application.

Hereinafter, an exemplary embodiment of the present invention will be described in detail with reference to the accompanying drawings so that those skilled in the technical field to which the present invention pertains may easily carry out the exemplary embodiment. However, the present invention may be implemented in various different ways, and is not limited to the exemplary embodiments described herein.

Figure 1:
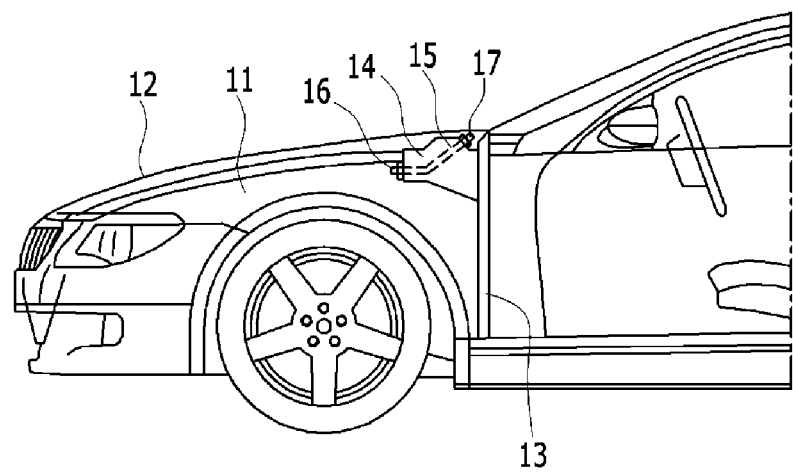
FIG. 1 is a view illustrating a state in which a fire extinguishing pipe according to an exemplary embodiment of the present invention is connected to an engine compartment through a cowl assembly.
Figure 2:
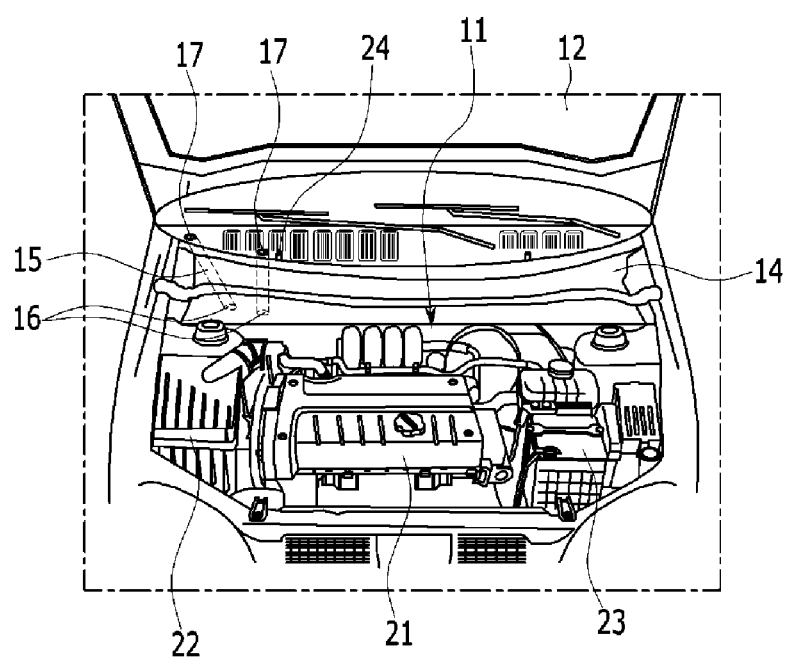
FIG. 2 is a view illustrating a mounting position of the fire extinguishing pipe according to the exemplary embodiment of the present invention.
Figure 3:
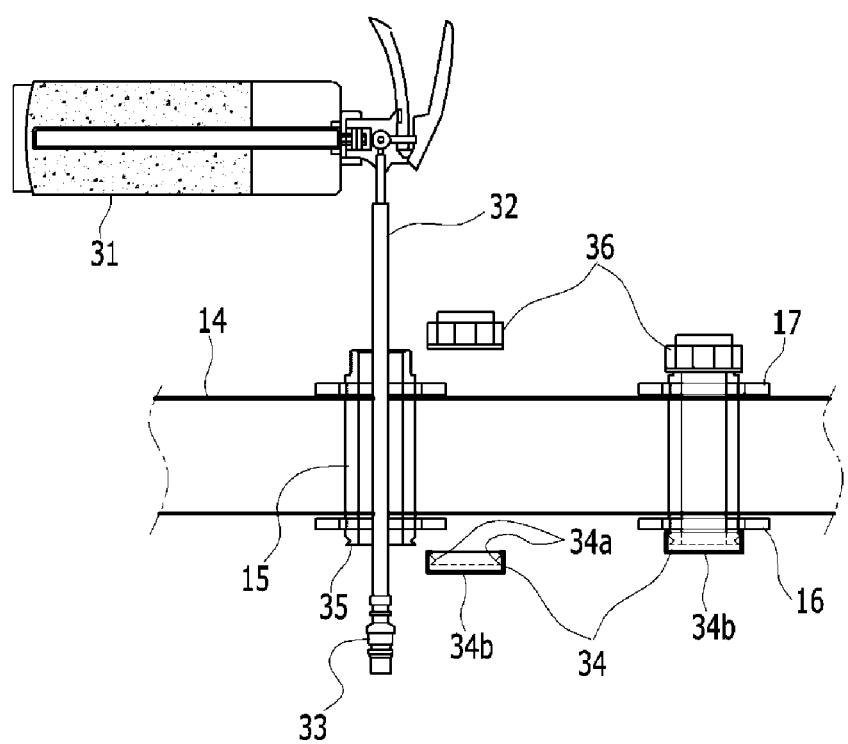
FIG. 3 is a view illustrating a state in which a fire extinguishing nozzle of a fire extinguisher penetrates the fire extinguishing pipe according to the exemplary embodiment of the present invention.

FIG. 1 is a view illustrating a state in which a fire extinguishing pipe according to an exemplary embodiment of the present invention is connected to an engine compartment through a cowl assembly. FIG. 1 is a view when viewing a lateral side of a front portion of a vehicle and illustrates a state in which a fire extinguishing pipe 15 is installed in a cowl assembly installed between an engine compartment 11 and a front glass windshield for a vehicle. FIG. 2 is a view illustrating a mounting position of the fire extinguishing pipe according to the exemplary embodiment of the present invention. FIG. 2 is a view when viewing the engine compartment from above in a state in which a hood 12 is opened. FIG. 2 illustrates a position of the fire extinguishing pipe when only the fire extinguishing pipe is added to the cowl assembly. Further, FIG. 3 is a view illustrating a state in which a fire extinguishing nozzle of a fire extinguisher penetrates the fire extinguishing pipe according to the exemplary embodiment of the present invention. FIG. 3 illustrates a method of connecting a fire extinguisher to the fire extinguishing pipe 15 and using the fire extinguisher when a fire occurs in the engine compartment. A fire extinguishing nozzle 33 of the fire extinguisher may be inserted into the engine compartment 11 through the fire extinguishing pipe 15, and may inject a fire extinguishing material directly into the engine compartment 11. Here, the fire extinguisher may include a main body 31 configured to store a fire extinguishing material including a fire extinguishing fluid or a fire extinguishing powder, a fire extinguishing hose 32, and the fire extinguishing nozzle 33.

Referring to FIGS. 1 to 3, the fire extinguishing apparatus for a vehicle according to the exemplary embodiment of the present invention includes a cowl assembly 14 and the fire extinguishing pipe 15. The cowl assembly 14 may be provided at a boundary between the outside and the engine compartment 11 that defines an internal space of the vehicle, and the cowl assembly 14 may divide the engine compartment 11 from the outside. Here, the vehicle may be a passenger vehicle in which the engine compartment 11 is covered by the hood 12. Further, the vehicle further includes an interior compartment which is divided from the engine compartment 11 and in which an occupant is seated. The engine compartment 11 and the interior compartment may be divided by a dash panel 13. Referring to FIGS. 1 and 2, an engine 21, an air cleaner 22, and a battery 23 may be provided in the engine compartment 11, and a wiper fluid spray nozzle 24 may be provided in the cowl assembly. Further, multiple fire extinguishing pipes 15 may be installed at intervals in the cowl assembly installed between the engine compartment 11 and the front glass windshield for a vehicle.

The fire extinguishing pipe 15 may be coupled to the cowl assembly 14 and allow the engine compartment 11 to communicate with the outside. An inlet portion of the fire extinguishing pipe 15, of which at least one end is exposed to the outside, may be connected to the fire extinguisher having the fire extinguishing material therein, and an outlet portion of the fire extinguishing pipe 15 may be partially exposed into the engine compartment 11 and guide the fire extinguishing material discharged from the fire extinguisher so that the fire extinguishing material is injected into the engine compartment 11. The fire extinguishing pipe 15 may be elongated with a hollow shape so as to penetrate the cowl assembly 14. As necessary, the fire extinguishing pipe 15 may have a rectilinear shape, a curved shape, or a combination of the rectilinear shape and the curved shape, and may be coupled to the cowl assembly 14.

As illustrated in FIGS. 1 and 2, an outer portion of the fire extinguishing pipe 15, which penetrates the cowl assembly 14, may be positioned at a side of a passenger seat and in the vicinity of the wiper fluid spray nozzle. In addition, the outer portion of the fire extinguishing pipe 15 may be positioned at the outermost side of a cowl cover at the side of the passenger seat. As necessary, the fire extinguishing pipe 15 may be positioned at a side of a driver seat and in the vicinity of the wiper fluid spray nozzle. Further, the opposite side of the fire extinguishing pipe 15 may be disposed in the engine compartment 11 so as to be in parallel with the ground surface or may be inclined with respect to the ground surface. For example, an inner portion of the fire extinguishing pipe 15 may be positioned toward the engine.

Locking nuts configured to fix the fire extinguishing pipe 15 may be coupled to the two opposite ends of the fire extinguishing pipe 15. The locking nuts may include a first locking nut 16 coupled to the outlet portion protruding to the inside of the engine compartment 11, and a second locking nut 17 coupled to the inlet portion protruding to the outside of the cowl assembly 14. The first locking nut 16 and the second locking nut 17 may have the same shape and may be interchangeable with each other.

Meanwhile, the fire extinguishing pipe 15 may have an opening/closing structure at any one of the two opposite ends in the longitudinal direction in which the fire extinguishing pipe 15 is elongated in a hollow shape. The fire extinguishing pipe 15 may include first and second caps 36 and 34 coupled to the two opposite ends of the fire extinguishing pipe 15. The first cap 36 and the second cap 34 may be made of different materials. The first cap 36 may be coupled to the inlet portion of the fire extinguishing pipe 15, thereby restricting the opening/closing of the fire extinguishing pipe 15 with respect to the outside.

A handle portion is provided on an outer surface of the first cap 36, and a heat resistive plastic cap having a screw thread is formed on an inner surface thereof. The handle portion of the first cap 36 may protrude to the outside like a handle of a fuel cap.

The second cap 34 may be coupled to the outlet portion, thereby restricting the opening/closing of the fire extinguishing pipe 15 with respect to the inside. The second cap 34 may include a metal cap that has a catching protrusion 34a coupled to an outer circumferential surface of the outlet portion and is opened or closed by external force in a one touch manner. The catching protrusion 34a of the second cap 34 may be fixed to a fixing groove 35 provided at an end of the outlet portion of the fire extinguishing pipe 15. A heat blocking coating layer 34b may be formed on an outer surface of the second cap 34 which is exposed toward the inside of the engine compartment 11. The second cap 34 may maintain the fire extinguishing pipe 15 in a closed state, and the heat blocking coating layer 34b may be formed on the outer surface of the second cap 34, thereby preventing a fire or smoke, which occurs in the engine compartment 11, from being transferred to the outside through the fire extinguishing pipe 15.

Meanwhile, in a case in which an automatic fire extinguishing apparatus using a fire detecting sensor is installed in the engine compartment 11, it may be difficult to extinguish a fire in the engine compartment 11 due to a malfunction of precise components such as a sensor or a fire in a fire extinguishing line. In addition, overall vehicle maintenance costs may be increased due to the costs for installing the automatic fire extinguishing apparatus. Further, when a fire spreads to the periphery of the engine compartment 11, the capacity of the fire extinguisher for a vehicle is relatively smaller than a range of the fire, and it is difficult to inject the fire extinguishing material directly into the engine compartment 11 with the fire extinguishing nozzle 33 mounted at the fixed position.

However, in most cases, when the vehicle travels, the fire occurring in the engine compartment 11 may be detected by the driver at a point in time at which a small amount of smoke occurs. In this case, the fire may be extinguished at the initial time if the fire extinguishing material of the fire extinguisher can be effectively injected into the engine compartment 11. To this end, the fire extinguishing pipe 15, which is a passageway that may connect the engine compartment 11 and the fire extinguisher, is provided.

Further, the fire extinguishing material of the fire extinguisher may be injected from the outside of the vehicle directly into the engine compartment 11 through the fire extinguishing pipe 15 to extinguish the fire in the engine compartment 11. That is, a passageway, which is to be connected to the fire extinguishing nozzle 33 of the fire extinguisher, needs to be provided at the periphery of the engine compartment 11 of the vehicle. In the exemplary embodiment of the present invention, the fire extinguishing pipe 15 may be provided in the cowl assembly in consideration of the function and aesthetic appearance of the fire extinguishing apparatus for a vehicle, and the fire extinguishing material of the fire extinguisher may be effectively injected into the engine compartment 11, thereby extinguishing the fire in the engine compartment 11.

When it is assumed with reference to FIGS. 1 to 3 that a fire occurs in the engine compartment 11, a user approaches the cowl assembly at the side of the passenger seat where the fire extinguishing pipe 15 is coupled, opens the first cap 36 coupled to the outwardly exposed portion of the fire extinguishing pipe 15, and then strongly pushes the fire extinguishing nozzle 33 of the fire extinguisher into the fire extinguishing pipe 15. Then, the external force transmitted to the fire extinguishing nozzle 33 is transmitted to the second cap 34 coupled to the inwardly exposed portion of the fire extinguishing pipe 15. If the external force, which is transmitted to the second cap 34 through the fire extinguishing nozzle 33, is higher than fixing force of the second cap 34, the second cap 34 may be separated from the fire extinguishing pipe 15, and the communication between the outside and the engine compartment 11 may be maintained by the fire extinguishing pipe 15. As the fire extinguishing pipe 15 is opened, the fire extinguishing nozzle 33 connected to an external fire extinguisher is inserted into the engine compartment 11 through the fire extinguishing pipe 15. When it is assumed that the engine compartment 11 is closed by the hood 12, the engine compartment 11 has a restricted region in which five sides, excluding a bottom side among six sides, are blocked. It is therefore possible to more effectively extinguish the fire when the fire extinguishing material is injected into the engine compartment 11 in this state than when the fire extinguishing material is injected into the open area made by opening the hood 12.

Figure 4:
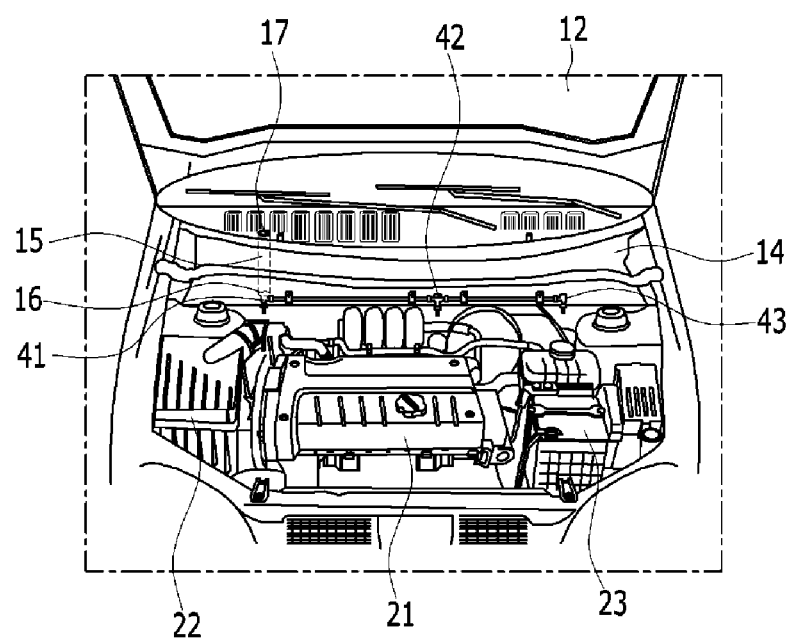
FIG. 4 is a view illustrating mounting positions of a fire extinguishing pipe and an injection unit according to another exemplary embodiment of the present invention.
Figure 5:
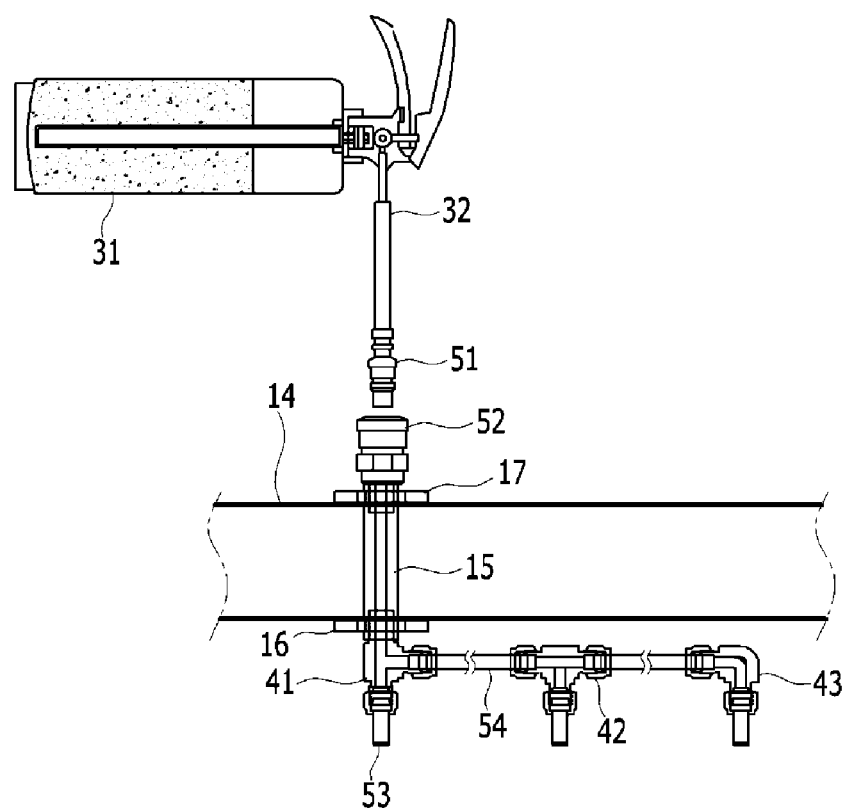
FIG. 5 is a view illustrating a state in which a fire extinguishing nozzle of a fire extinguisher is connected to a fire extinguishing pipe according to another exemplary embodiment of the present invention.

FIG. 4 is a view illustrating mounting positions of a fire extinguishing pipe and an injection unit according to another exemplary embodiment of the present invention, and FIG. 5 is a view illustrating a state in which a fire extinguishing nozzle of a fire extinguisher is connected to the fire extinguishing pipe according to the exemplary embodiment of the present invention. Referring to FIGS. 4 and 5, a fire extinguishing apparatus for a vehicle according to another exemplary embodiment of the present invention may basically be a structure in which the fire extinguishing material of the fire extinguisher is injected into the engine compartment 11 from the outside of the vehicle through the fire extinguishing pipe 15 provided in the cowl assembly 14. For example, the fire extinguishing apparatus may include the fire extinguishing pipe 15 configured to penetrate the cowl assembly 14, and the first and second locking nuts 16 and 17 configured to fix the fire extinguishing pipe 15. However, there is a difference in that the fire extinguishing nozzle of the fire extinguisher and the inlet portion of the fire extinguishing pipe 15 are coupled to each other by means of a quick coupling structure and an injection unit is coupled to the outlet portion of the fire extinguishing pipe 15.

The quick couplings may include a first quick coupling 51 connected to the fire extinguishing nozzle of the fire extinguisher, and a second quick coupling 52 coupled to the inlet portion and connected to the first quick coupling 51. Here, the second quick coupling 52 may maintain a closed state of the fire extinguishing pipe 15 when the first quick coupling 51 is separated from the second quick coupling 52. The second quick coupling 52 may maintain an opened state of the fire extinguishing pipe 15 when the first quick coupling 51 is connected to the second quick coupling 52. The quick coupling may include a pneumatic quick coupling. The pneumatic quick coupling may include a male connector and a female connector, and the user may quickly and easily connect the fire extinguishing nozzle to the pneumatic quick coupling. The first quick coupling 51 may be formed as a male connector, and the second quick coupling 52 may be formed as a female connector. A check valve may be included in the second quick coupling 52. The check valve may be opened when the first quick coupling 51 and the second quick coupling 52 are connected to each other, thereby maintaining the opened state of the fire extinguishing pipe 15. Further, the check valve may be closed when the first quick coupling 51 and the second quick coupling 52 are separated from each other, thereby maintaining the closed state of the fire extinguishing pipe 15. As described above, when the first quick coupling 51 connected to the fire extinguishing nozzle of the fire extinguisher and the second quick coupling 52 connected to the fire extinguishing pipe 15 are separated from each other, the check valve is closed, and the fire extinguishing pipe 15 is closed, such that a separate blocking device is not required. Therefore, the user may more quickly and safely connect the fire extinguisher to the engine compartment 11.

An inflow portion of the injection unit may be disposed in the engine compartment 11 and connected to the outlet portion of the fire extinguishing pipe 15, and a discharge portion of the injection unit, which is connected to the inflow portion through the fire extinguishing line, may be provided at a predetermined portion, thereby injecting the fire extinguishing material which is supplied from the fire extinguisher into the engine compartment 11. Here, the multiple injection units may be provided at predetermined intervals by means of multiple tube fittings connected to the fire extinguishing line. As illustrated in FIGS. 4 and 5, a necessary number of injection units may be installed at necessary positions in the engine compartment 11. In the injection unit, the tube fittings having various shapes may be connected, thereby injecting the fire extinguishing material through the multiple tube fittings. For example, the tube fittings may include a male run tee 41, a union tee 42, and a union elbow 43. Further, tubes 54 and injection nozzles 53 may be provided to connect the tube fittings. Therefore, the number of fire extinguishing nozzles connected to the engine compartment 11 may be substantially increased. As described above, in the injection unit, the tube fittings corresponding to the fire extinguishing pipe 15 may be connected and the fire extinguishing nozzle may be extended, thereby improving the fire extinguishing ability of the fire extinguisher. Further, the injection unit may be preferentially applied to a portion where the engine compartment 11 is so large or the interior of the engine compartment 11 is so narrow that it is not easy to inject the fire extinguishing material.

When it is assumed with reference to FIGS. 4 and 5 that a fire occurs in the engine compartment 11, the user approaches the cowl assembly at the side of the passenger seat where the fire extinguishing pipe 15 is coupled, and then first couples the first quick coupling 51 provided on the fire extinguishing nozzle of the fire extinguisher and the second quick coupling 52 provided on the fire extinguishing pipe 15. Since the first quick coupling 51 and the second quick coupling 52 are structured to be quickly and easily connected by the user, the fire extinguisher and the engine compartment 11 may be more quickly and simply connected to each other, thereby injecting the fire extinguishing material of the fire extinguisher into the engine compartment 11 through the fire extinguishing pipe 15 and the injection unit. Therefore, it is possible to more effectively extinguish the fire in the engine compartment 11.

Meanwhile, since the fire extinguishing pipe 15 is closed by the check valve included in the second quick coupling 52 when the first quick coupling 51 and the second quick coupling 52 are separated from each other, a separate device for blocking the fire extinguishing pipe 15 is not required. In addition, the first quick coupling 51 provided on the fire extinguishing nozzle of the fire extinguisher may also be used as a separate injection nozzle, thereby providing an advantage in that separate replacement is not required. As necessary, the first quick coupling 51 may be implemented by integrally coupling the quick coupling structure to the fire extinguishing nozzle of the fire extinguisher.

While the exemplary embodiments of the present invention have been described above, the present invention is not limited thereto, and various modifications can be made and carried out within the scope of the claims, the detailed description of the invention, and the accompanying drawings, and also fall within the scope of the invention.

What is claimed is:

1. A fire extinguishing apparatus for a vehicle having a cowl assembly located between a front windshield and an engine compartment, and configured to separate an outside of the vehicle from the engine compartment, comprising:
   a fire extinguishing pipe coupled to the cowl assembly to allow the engine compartment to communicate with the outside and provided with an inlet portion exposed to the outside and an outlet portion exposed to the engine compartment;
   a plastic cap coupled to the inlet portion of the fire extinguishing pipe to block an end of the inlet portion from the outside and configured to be opened for allowing a connection of a fire extinguisher; and
   a metal cap coupled to the outlet portion of the fire extinguishing pipe to block an end of the outlet portion from the engine compartment and configured to be opened for allowing injection of a fire extinguishing material discharged from the fire extinguisher into the engine compartment.

2. The fire extinguishing apparatus of claim 1, wherein the plastic cap has a handle portion provided on an outer surface thereof and a screw thread provided on an inner surface thereof, and
   the plastic cap is made of a heat resistive plastic.

3. The fire extinguishing apparatus of claim 1, wherein the metal cap includes a catching protrusion coupled to an outer circumferential surface of the outlet portion, and is configured to be opened or closed in a one touch manner by external force.

4. The fire extinguishing apparatus of claim 3, wherein the metal cap has a heat blocking coating layer formed on an outer surface thereof exposed to the engine compartment.

5. The fire extinguishing apparatus of claim 1, wherein the fire extinguishing pipe has a screw thread provided on an outer surface of the inlet portion to connect the plastic cap and a fixing groove provided on the outlet portion to connect the metal cap.

* * * * *